United States Patent Office 2,890,197
Patented June 9, 1959

2,890,197

COMPOSITION COMPRISING A DIEPOXIDE, A POLYCARBOXYLIC ACID AND A POLYHYDRIC COMPOUND

Benjamin Phillips and Paul S. Starcher, Charleston, and Charles W. McGary, Jr., and Charles T. Patrick, Jr., South Charleston, W. Va., assignors to Union Carbide Corporation, a corporation of New York No Drawing. Application April 4, 1957
Serial No. 650,556

7 Claims. (Cl. 260—45.4)

This invention relates to novel, polymerizable, curable compositions; to cured compositions prepared therefrom and to methods of making the same. More particularly, this invention is directed to novel, polymerizable, curable epoxy-containing compositions and has for an object the provision of novel epoxy-containing compositions useful in the arts of molding, coatings, laminating, adhesives, castings and the like.

The curable compositions of this invention are low viscosity liquids at temperatures ranging upwards from room temperatures. Numerous advantages and objects can be attained by employment of the compositions of this invention. For example, these compositions are compatible with a wide variety of fillers and pigments which may be employed therein, if desired, to adjust the composition viscosity and at the same time enhance the physical properties of resins formed therefrom. These compositions can be easily handled in such resin-forming applications as coatings, bonding, laminating, molding, casting, potting and the like, without the need of solvents or diluents although such solvents or diluents can be used, if desired. In casting applications, these compositions can be made to fill small intricacies of molds without applying high pressures or heating to high temperatures. In coating applications, they can be easily spread, brushed, or sprayed on surfaces by the many techniques available to the paint, lacquer and varnish industries. These curable compositions undergo negligible shrinkage when cured and are particularly useful in bonding, casting, molding and potting, wherein undue shrinkage is particularly undesirable. These compositions can be easily prepared using low temperatures at which no gelation occurs during preparation. However, they can be cured rapidly at higher temperatures. The pot lives of these compositions can be controlled, as desired. These compositions can be made with relatively short pot lives, of the order of a few minutes, with relatively long pot lives, of the order of several hours or of several days, or with pot lives of intermediate duration, as desired.

The cured resins are transparent and water-resistant. They can be made as hard, rigid, infusible products, as tough, flexible, infusible products or as products having intermediate degrees of hardness and rigidity or toughness and flexibility, as desired. These resins can be machined to desired shapes and configurations and can be polished to provide appealing finishes. They can be made as infusible products which are resistant to most organic solvents. These resins can also be made as products having high heat distortion values, and are capable of sustaining heavy loads at high temperatures. In accordance with this invention, resins having combinations of any one or several of these useful properties can be produced.

The novel compositions of the present invention are directed to polymerizable, curable compositions comprising (a) epoxides characterized by the general formula:

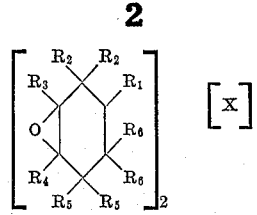

wherein X represents divalent radicals selected from the group consisting of

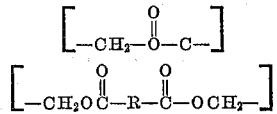

and

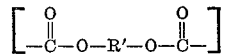

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent hydrogen or lower alkyl groups; (b) a polycarboxylic acid compound in an amount having y carboxyl equivalents per epoxy equivalent of said epoxide; and (c) a polyol in an amount having z hydroxyl equivalents per epoxy equivalent of said epoxide, wherein y is a number in the range of from 0.1 to 1.5; z is a number in the range of from 0.01 to 1.0; the sum of y and z is not greater than 1.5 and y/z is at least 1.0.

More particularly, the compositions of this invention are directed to polymerizable, curable compositions comprising (a) epoxides characterized by the general formula:

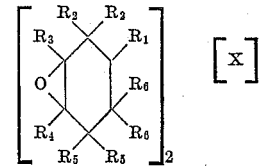

wherein X represents divalent radicals selected from the group consisting of

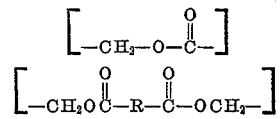

and

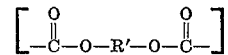

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent hydrogen or lower alkyl groups; (b) a polycarboxylic acid compound, and preferably a polycarboxylic acid, in an amount having y carboxyl equivalents per epoxy equivalent of said diepoxide; and (c) a polyol in an amount having z hydroxyl equivalents per epoxy equivalent of said diepoxide, wherein y is a number in the range of from 0.4 to 1.0; z is a number in the range of from 0.01 to 1.0; the sum of y and z is not greater than 1.0; and y/z is at least 1.0.

A preferred novel sub-class of the broadest embodiment of the invention is directed to polymerizable, curable compositions comprising (a) a 3,4-epoxycyclohexyl-methyl 3,4-epoxy-cyclohexanecarboxylate; (b) a dicarboxylic acid in an amount having y carboxyl equivalents per epoxy equivalent of said epoxide; and (c) a polyol in an amount having z hydroxyl equivalents per epoxy equivalent of said epoxide, wherein y is a number in the range of from 0.1 to 1.5; z is a number in the range of from 0.01 to 1.0; the sum of y and z is not greater than 1.5; and x/z is at least 1.0.

A particularly preferred novel sub-class of the broadest embodiment of the invention is directed to polymerizable, curable compositions comprising (a) a 3,4-epoxycyclohexylmethyl 3,4-epoxycyclohexanecarboxylate; (b) a dicarboxylic acid in an amount having y carboxyl equivalents per epoxy equivalent of said epoxide; and (c) a polyhydric phenol in an amount having z hydroxyl equivalents per epoxy equivalent of said epoxide, wherein y is a number in the range of from 0.1 to 1.5; z is a number in the range of from 0.01 to 1.0; the sum of y and z is not greater than 1.5; and y/z is at least 1.0.

More particularly preferred novel sub-classes to which this invention is directed include epoxides such as 3,4-epoxycyclohexylmethyl 3,4-epoxycyclohexanecarboxylate; 3,4-epoxy-6-methylcyclohexylmethyl 3,4-epoxy-6-methylcyclohexanecarboxylate; (b) a dicarboxylic acid such as glutaric, adipic, pimelic, and sebacic in an amount having y carboxyl equivalents per epoxy equivalent of said epoxide; and (c) a polyhydric phenol such as diphenylolpropane, resorcinol and pyrogallol, in an amount having z hydroxyl equivalents per epoxy equivalent of said epoxide, wherein y is a number in the range of from 0.1 to 1.5; z is a number in the range of from 0.01 to 1.0; the sum of y and z is not greater than 1.5; and x/z is at least 1.0.

The compositions of the invention can be prepared by mixing the epoxides described above with a polycarboxylic acid and a polyol. In making homogeneous compositions, it has been found to be advantageous to raise the temperature of the reaction mixture to at least the melting point of the highest melting component of the reaction mixture. Homogeneous compositions with liquid polyols and solid polycarboxylic acids can be advantageously obtained by heating the acid to at least its melting point and then adding it to a mixture of the epoxide and polyol. Of course, any other sequence which involves the transformation of the acid to the liquid form may be employed to form a homogeneous composition. Similarly, homogeneous compositions can be obtained with solid polyols by first heating said polyols to at least the melting point.

Acidic catalysts can be added, if desired, to accelerate the rate of curing or polymerization. Catalysts in amounts ranging up to 5.0 weight percent based on the weight of the diepoxide can be added at this point; at any time prior to curing or not at all, as desired. Higher catalyst concentrations above this range are also effective, although concentrations of 5.0 weight percent and below have been found to be adequate. Catalyst concentrations of 0.001 to 5.0 weight percent based on the weight of the diepoxide are particularly preferred. This composition then can be cooled to room temperature and stored for future use, if desired, or used immediately. Other polyfunctional materials also may be incorporated into the curable compositions. Such polyfunctional materials include other polyepoxides, e.g., polyglycidyl ethers of polyhydric phenols and the like, low molecular weight urea-formaldehyde or phenol-formaldehyde polymers and the like. Many variations in the physical properties of the resin compositions can be obtained by employing such other polyfunctional materials in the curable compositions of this invention.

Curing can be carried out by maintaining the curable compositions at temperatures from about 50° C. to 250° C. Temperatures higher than 250° C. can be used, although some discoloration, which may not be desirable in the final product may result. The time for effecting a complete cure can be varied from several minutes to several hours. While not wishing to be bound by any particular theory or mechanisms of reaction, it is believed that the curing or polymerization occurs as follows:

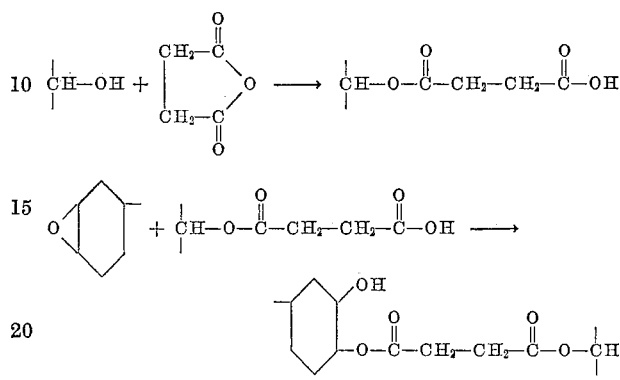

Since a hydroxyl group is generated, additional acid will serve to cross-link the polymer—or cross-linking can be accomplished through etherification (self polymerization).

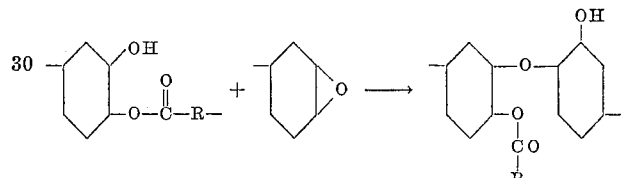

Also, if the polyol is tri- or tetra-functional, cross-linking can be obtained whether or not the generated hydroxyl is functional.

The compositions of this invention have been described above, in terms of epoxy equivalents, hydroxyl equivalents, and carboxyl equivalents. By the term "epoxy equivalent," as used herein, is meant the number of epoxy groups

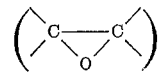

contained by a mol of epoxides described above. For example, one mol of 3,4-epoxy-6-methylcyclohexylmethyl 3,4-epoxy-6-methylcyclohexanecarboxylate contains two epoxy equivalents. The term "carboxyl equivalent," as employed herein, is intended to mean the number of carboxyl groups (—COOH) contained by a mol of a polycarboxylic acid compound. For example, the carboxyl equivalent of a dicarboxylic acid is the number of carboxyl groups which would be contained by an amount of the corresponding dicarboxylic acid. The term "hydroxyl equivalent," as used herein, is intended to mean the number of hydroxyl groups (—OH) contained in a mol of polyol. Thus, for example, one mol of glycerol contains 3 hydroxyl equivalents since it contains 3 hydroxyl groups. Thus, in expressing the novel compositions of this invention resort has been had to certain letters of the alphabet which are used to designate the relative proportions of the components of the systems, that is, polycarboxylic acid compounds and polyols, which provide useful compositions in accordance with the purposes and objects of the invention. Thus, the letter y is used to signify the number of carboxyl equivalents (—COOH) per epoxide equivalent and the letter z is used to signify the number of hydroxyl equivalents (—OH) per equivalent of epoxide. Since, as hereinbefore pointed out, useful compositions are obtained by employing proportions of polycarboxylic acid compound of from 0.1 to 1.5 equivalents of carboxyl groups per epoxy group and from 0.01 to 1.0 hydroxyl equivalent from the polyol per epoxy group, $y$ and $z$ will represent the number of carboxyl equivalents and hydroxyl equivalents, respectively, per epoxy equivalent, the sum of $y$ plus $z$ is not greater than 1.5; and the ratio of $y/z$ is at least 1.0 since the polycarboxylic acid compound is always the major component of the composition with respect to the polyol compound.

The polycarboxylic acid compounds which can be used in preparing the novel compositions of this invention include aliphatic, aromatic and cycloaliphatic dicarboxylic acids such as, for example, oxalic acid, malonic acid, succinic aid, glutaric acid, adipic acid, pimelic acid, suberic acid, azelaic acid, sebacic acid, alkylsuccinic acids, alkenylsuccinic acids, maleic acid, fumari acid, itaconic acid, citraconic acid, mesaconic acid, glutaconic acid, muconic acid, ethylidenemalonic acid, isopropylidenamalonic acid, allylmalonic acid, 1,2-cyclohexanedicarboxylic acid, 1,4-cyclohexanedicarboxylic acid, 2-carboxy-2-methylcyclohexaneacetic, phthalic acid, isophthalic acid, terephthalic acid, 1,8-naphthalenedicarboxylic acid, 3-carboxycinnamic acid, 1,2-naphthalene dicarboxylic acid, tetrahydrophtalic acid, and tetrachlorophthalic acid. Preferred aliphatic dicarboxylic acids include aliphatic dibasic acids containing from five through ten carbon atoms. Other suitable polycarboxylic acid compounds include tricarboxylic acids such as 1,1,5-pentanetricarboxylic acid, 1,2,4-hexanetricarboxylic acid, 2-propyl-1,2,4-pentanetricarboxylic acid, 5-octene-3,3,6-tricarboxylic acid, 1,2,3-propanetricarboxylic acid, 1,2,4-benzenetricarboxylic acid and the like. Other suitable polycarboxylic acid compounds include polycarboxy acid-esters or polyesters containing carboxylic acid end groups prepared by the reaction of an acid or acid anhydride and a polyhydric alcohol. Typical polyhydric alcohols which can be reacted with any of the above-mentioned polycarboxylic acid or polycarboxylic acid anhydrides to provide acid-esters or polyesters containing carboxylic acid end groups suitable for use in preparing the novel compositions of this invention include ethylene glycol, diethylene glycol, triethylene glycol, tetraethylene glycol, 1,2-propylene glycol, 1,3-propylene glycol, dipropylene glycol, tripropylene glycol, 1,2-butylene glycol, 1,4-butanediol, 1,5-pentanediol, 2,4-pentanediol, 2,2-dimethyltrimethylene glycol, 1,5-hexanediol, 2,5-hexanediol, 1,6-hexanediol, 3-methyl-1,5-pentanediol, 2-methylpentane-2,5-diol, 3-methylpentane-2,5-diol, 1,4-hexanediol, 2,2-diethyl-1,3-propanediol, 2-methoxymethyl-2,4-dimethylpentane-1,5-diol, 2-ethoxymethyl-2,4-dimethylpentane-1,5-diol, 2-ethyl-1,3-hexanediol, 2,5-dimethylhexane-2,5-diol, octadecane-1,12-diol, glycerol, 1,2,6-hexanetriol, 1,1,1-trimethylol propane, trimethylol methane, pentaerythritol, dipentaerythritol, diglycerol, pentaglycerol, sorbitol, mannitol polyvinyl alcohol of varying molecular weights and the like.

Preferred polycarboxy acid-esters or polyesters containing carboxyl end groups are those prepared from the dicarboxylic acids or dicarboxylic acid anhydrides enumerated above and dihydric, trihydric and tetrahydric alcohols.

The ratios, in which the dicarboxylic acid or dicarboxylic acid anhydride can be reacted with polyhydric alcohols of the type referred to above, are limited to those which provide carboxyl end groups. Thus, the dicarboxylic acid or dicarboxylic acid anhydride must be reacted with the polyhydric alcohol in greater than equivalent amounts and care must be taken, in the case of tri- and tetra-functional reactants, that gelation does not occur due to the formation of crosslinked polyesters. The acid-ester or polyester must be soluble in the diepoxide-acid anhydride. It has been discovered that suitable polyesters can be prepared provided the mol ratio ranges prescribed in the accompanying Table I are observed.

TABLE I

| Alcohol | Mol Ratio of Acid or Anhydride/Alcohol | |
|---|---|---|
| | Usable | Preferred |
| trihydric | 2.2 to 3.0 | 2.5 to 3.0 |
| tetrahydric | 3.3 to 4.0 | 3.5 to 4.0 |

The preferred anhydrides are the dicarboxylic acid anhydrides and preferably the hydrocarbon dicarboxylic acid anhydrides, which include for example, phthalic anhydride, tetrahydrophthalic anhydride, hexahydrophthalic anhydride, maleic anhydride, glutaric anhydride, adipic anhydride, succinic anhydride, itaconic anhydride, heptyl succinic anhydride, hexylsuccinic anhydride, methylbutylsuccinic anhydride, methyltetrahydrophthalic anhydride, nonenylsuccinic anhydride, octenylsuccinic anhydride, pentenylsuccinic anhydride, propylsuccinic anhydride, 1,2,4,5 - benzenetetracarboxylic dianhydride, citraconic anhydride, 4 - nitrophthalic anhydride, 1,2 - naphthalic anhydride, 2,3-naphthalic anhydride, and 1,8-naphthalic anhydride. Polymeric anhydrides or mixed polymeric anhydrides of sebacic, adipic, pimelic, cyclohexane 1,4-dicarboxylic, terephthalic and isophthalic acids are also useful.

By the term "polyol," as used herein, is meant an organic compound having at least two hydroxyl groups or both alcoholic and phenolic hydroxyl groups. Typical polyols can be represented by the general formula:

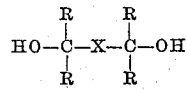

R is an alkyl group or hydrogen and can be the same or different for all R's in the molecule. X can be a single bond or a divalent group composed of a carbon atom or group of carbon atoms interconnected by single or multiple bonds and to which such groups as hydrogen, alkyl, hydroxyl, cyclic groups and the like or combinations thereof can be attached. X can also represent such divalent groups as oxyalkylene or polyoxyalkylene groups. X, as a divalent group may represent a carbon atom group which contains sulfur. It can also represent cyclic groups, such as phenylene, cyclohexylene and the like. The R's and X together with the carbon atoms, i.e., the C's of the formula, can represent a cyclic group such as phenylene, cyclohexylene and the like. The presence of other groups, with the exception of tautomeric enolic groups, not specifically listed herein and not participating in the curing reaction is by no means harmful and, in fact, can be useful in developing special properties in our resins. Mixtures of polyols or only one polyol can be employed in our curable compositions.

Representative polyols which can be employed in the compositions are polyhydric alcohols, such as ethylene glycol, diethylene glycol, polyethylene glycols, propylene glycol, tripropylene glycol, polypropylene glycols, polyethylenepolypropylene glycols, trimethylene glycol, butanediols, pentanediols, 2-ethyl-1,3-hexanediol, 2-methyl-2,4-pentanediol, 12,13-tetracosanediol, 2-butene-1,4-diol, 2 - methoxymethyl - 2,4 - dimethyl - 1,5 - pentanediol, diethanolamine, triethanolamine, glycerol, polyglycerols, pentaerythritol, sorbitol, polyvinyl alcohols, cyclohexanediols, cyclopentanediols, inositol, trimethylolphenol, and polyhydric phenols, such as dihydroxytoluenes, resorcinol, bis(4-hydroxyphenyl)-2,2-propane, bis(4-hydroxyphenyl) methane, the polyhydric phenolic-formaldehyde condensation products, and the like. Polyols which are free of acetylenic unsaturation and composed of carbon, hydrogen and oxygen combined as hydroxyl oxygen or ether oxygen connecting two otherwise unconnected carbon atoms and having not more than 24 carbon atoms are preferred.

The diepoxides hereinbefore described which are suitable for use in preparing the novel compositions of this invention include the 3,4-epoxycyclohexylmethyl 3,4-epoxycyclohexanecarboxylates; the aliphatic diol bis(3,4-epoxycyclohexanecarboxylates); and the bis(3,4-epoxycyclohexylmethyl) dicarboxylates.

The 3,4-epoxycyclohexylmethyl 3,4-epoxycyclohexanecarboxylates referred to above can be conveniently characterized by the following general formula:

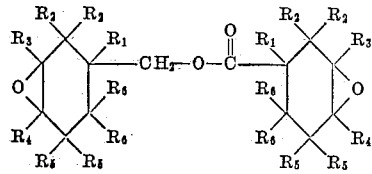

wherein $R_1$, $R_2$, $R_3$, $R_4$, $R_5$, and $R_6$ represent a hydrogen atom or an aliphatic hydrocarbon radical, and include 3,4-epoxy-1-methylcyclohexylmethyl 3,4-epoxy-1-methylcyclohexanecarboxylate; 3,4-epoxy-2-methylcyclohexylmethyl 3,4-epoxy-2-methylcyclohexanecarboxylate; 3,4-epoxy-6-methylcyclohexylmethyl 3,4-epoxy-6-methylcyclohexanecarboxylate; 3,4-epoxy-3-methylcyclohexylmethyl 3,4-epoxy-3-methylcyclohexanecarboxylate; 3,4-epoxy-4-methylcyclohexylmethyl 3,4-epoxy-4-methylcyclohexanecarboxylate; 3,4-epoxy-5-methylcyclohexylmethyl 3,4-epoxy-5-methylcyclohexanecarboxylate; and a lower alkyl substituted 3,4-epoxycyclohexylmethyl 3,4-epoxycyclohexanecarboxylate.

The aliphatic diol bis(3,4-epoxycyclohexanecarboxyates) include the dihydric alcohol diesters of acids selected from the group consisting of 3,4-epoxycyclohexanecarboxylic acid and lower alkyl substituted 3,4-epoxycyclohexanecarboxylic acids in which the hydroxyl groups of said dihydric alcohols are esterified by said acids and wherein said dihydric alcohol represents members selected from the group consisting of lower aliphatic hydrocarbon glycols and polyalkylene glycols corresponding to the general formula:

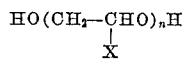

wherein X represents members selected from the group consisting of hydrogen and methyl groups and $n$ represents a positive integer in the range of from 2 through 3. Typical aliphatic diol bis(3,4-epoxycyclohexanecarboxylates) include ethylene glycol bis(3,4-epoxycyclohexanecarboxylate); 2-ethyl-1,3-hexanediol bis(3,4-epoxycyclohexanecarboxylate); 3-methyl-1,5-pentanediol bis(3,4-epoxycyclohexanecarboxylate); 1,5-pentanediol bis(3,4-epoxycyclohexanecarboxylate); and 1,6-hexanediol bis(3,4-epoxycyclohexanecarboxylate).

The bis(3,4-epoxycyclohexylmethyl) dicarboxylates include the hydrocarbon dicarboxylic acid diesters of alcohols selected from the group consisting of 3,4-epoxycyclohexylmethanol and lower alkyl substituted 3,4-epoxycyclohexylmethanols in which the carboxyl groups of said dicarboxylic acid are esterified by said alcohols and wherein the dicarboxylic acid contains from 2 through 12 carbon atoms. Typical bis(3,4-epoxycyclohexylmethyl) dicarboxylates include bis(3,4-epoxycyclohexylmethyl) maleate; bis(3,4-epoxycyclohexylmethyl) pimelate; bis(3,4-epoxy-6-methylcyclohexylmethyl) maleate; bis(3,4-epoxy-6-methylcyclohexylmethyl) succinate; and bis(3,4-epoxycyclohexylmethyl) terephthalate.

The process of the invention is carried out, generally, by heating to a temperature of about 50° C. to 250° C., a mixture comprising a 3,4-epoxycyclohexylmethyl 3,4-cyclohexanecarboxylate, a polycarboxylic acid compound and a polyol. The preferred minimum temperature is that temperature at which the particular reaction mixture forms a homogeneous mass. Thus, with dicarboxylic acids, e.g., glutaric acid, temperatures of at least 80° C. are preferred, while with higher-melting acids, such as adipic acid, temperatures of about 100° C. to 110° C. are required. The temperature required for gelation within reasonable times is a temperature in the range of from 100° C. to 180° C. The heating times for gelation to occur generally vary from five minutes to five hours. This gelation time, however, can be significantly reduced by the use of various catalysts to accelerate the reaction. Typical catalysts include acids, such as sulfuric acid, stannic chloride, perchloric acid, and the like. Preferably, these catalysts are employed in an amount in the range of from 0.001 to 5.0 percent based on the weight of the diepoxide.

The curing of the gelated product may be allowed to proceed at the selected gelling temperature or, if desired, a more rapid cure can be had by raising the temperature as high as 250° C. It has been found that the time required for the formation of a hard, transparent and insoluble resin generally varies from five to ten minutes up to two to six hours, depending on whether a catalyst is used; the amount of the catalyst present and temperature employed.

Catalysts which can be employed with advantageous effects in accelerating the cure of the compositions are the acidic catalysts including mineral acids and metal halide Lewis acids. Representative of mineral acids which can be used in speeding the formation of the resins are sulfuric acid, perchloric acid, polyphosphoric acid and the various sulfonic acids, such as toluene sulfonic acid, benzene sulfonic acid and the like. Metal halide Lewis acids which are also effective in speeding the cure of the resins include boron trifluoride, stannic chloride, zinc chloride, aluminum chloride, ferric chloride and the like. The metal halide Lewis acid catalysts can also be used in the form of such complexes as etherate complexes and amine complexes, for example, boron trifluoride-piperidine and boron trifluoride-monoethylamine complexes. In the form of a complex, the metal halide Lewis acid catalyst is believed to remain substantially inactive until released as by dissociation of the complex upon increasing the temperature. When released from the complex, the catalyst then exerts its catalytic effect.

Uniform dispersion of catalyst in the compositions prior to curing has been found to be desirable in order to obtain homogeneous resins and to minimize localized curing around catalyst particles. Agitation of the compositions containing catalyst is adequate when the catalyst is miscible with said compositions. When the two are immiscible, the catalyst can be added in a solvent. Typical solvents for the catalysts include organic ethers, e.g., diethyl ether, dipropyl ether, 2-methoxy-1-propanol, organic esters, e.g., methyl acetate, ethyl acetate, ethylpropionate, organic ketones, e.g., acetone, methyl-isobutylketone, cyclohexanone, organic alcohols, e.g., methanol, cyclohexanol, propylene glycol and the like. The mineral acids can be employed as solutions in water, whereas metal halide Lewis acid catalysts tend to decompose in water and aqueous solutions of such Lewis acids are not preferred.

The following examples will serve to illustrate the practice of the invention. Barcol hardness values were determined at room temperature with a Barcol Impressor GYZG 934-1. Heat distortion values and Izod impact values were determined in accordance with ASTM methods D-648-45T and D-256-47T, respectively.

*Example 1.—Reaction of 3,4-epoxy-6-methylcyclohexylmethyl 3,4-epoxy-6-methylcyclohexanecarboxylate, adipic acid and diphenylol propane*

A mixture was prepared containing 2.8 grams of 3,4-epoxy-6-methylcyclohexylmethyl 3,4-epoxy-6-methylcyclohexanecarboxylate, 1.46 grams of adipic acid and 1.14 grams of diphenylol propane in amounts such as to provide 1.0 carboxyl equivalent per epoxy equivalent and 0.5 hydroxyl equivalent per epoxy equivalent. The mixture was heated to a temperature of 110° C. until homogeneous, thereupon the temperature was raised to 120° form a gel at 120° C. was 43 minutes. The gel was then subjected to a post cure at a temperature of 160° C. for a period of 6 hours and there was obtained a yellow, tough resin having a Barcol hardness of 24.

*Example 2.—Reaction of 3,4-epoxy-6-methylcyclohexylmethyl 3,4 - epoxy - 6 - methylcyclohexanecarboxylate, glutaric acid and pyrogallol*

A mixture was prepared containing 2.8 grams of 3,4-epoxy-6-methylcyclohexylmethyl 3,4-epoxy-6-methylcyclohexanecarboxylate, 0.66 gram of glutaric acid and 0.38 gram of pyrogallol such as to provide 0.5 carboxyl equivalent per epoxy equivalent and 0.3 hydroxyl equivalent per epoxy equivalent. The mixture was heated to a temperature of 110° C. until homogeneous, thereupon the temperature was raised to 120° C. for a period of about 3 hours. The time required to form a gel at 120° C. was 5 minutes. The gel was then subjected to a post cure at a temperature of 160° C. for a period of 6 hours and there was obtained a brown, tough resin having a Barcol hardness of 31.

*Example 3.—Reaction of 1,6-hexanediol bis(3,4-epoxycyclohexanecarboxylate), adipic acid and pyrogallol*

A mixture was prepared containing 1.83 grams of 1,6-hexanediol bis(3,4-epoxycyclohexanecarboxylate), 0.04 gram of pyrogallol and 1.02 grams of adipic acid in amounts such as to provide 1.4 carboxyl equivalents per epoxy equivalent and 0.1 hydroxyl equivalent per epoxy equivalent. The mixture was heated until homogeneous and the temperature was raised to a temperature of 120° C. to form a gel. The gel time at 120° C. was 10 hours. The gel was then subjected to a post cure for 18 hours at 120° C. and an additional 6 hours at a temperature of 160° C. There was obtained a hard, amber resin.

*Example 4.—Reaction of 1,6-hexanediol bis(3,4-epoxycyclohexanecarboxylate), diphenylolpropane and the acid ester adduct of 3 mols of succinic anhydride and 1 mol of glycerol*

A mixture was prepared containing 1.83 grams of 1,6-hexanediol bis(3,4-epoxycyclohexanecarboxylate), 0.97 gram of the acid ester adduct of 3 mols of succinic anhydride and 1 mol of glycerol, and 0.79 gram of diphenylolpropane such as to provide 0.8 carboxyl equivalent per epoxy equivalent and 0.7 hydroxyl equivalent per epoxy equivalent. The mixture was heated at 100° C. until homogeneous. The temperature was then raised to 120° C. and a gel was formed in 10 minutes. The mixture was subjected to a post cure for 1 hour at a temperature of 120° C. and for an additional 6 hours at 160° C. There was obtained a pale yellow, tough resin.

*Example 5.—Reaction of bis(3,4-epoxy-6-methylcyclohexylmethyl) sebacate, adipic acid and pyrogallol*

A mixture was prepared containing 2.25 grams of bis-(3,4-epoxy-6-methylcyclohexylmethyl) sebacate, 1.02 grams of adipic acid and 0.04 gram of pyrogallol such as to provide 1.4 carboxyl equivalents per epoxy equivalent and 0.1 hydroxyl equivalent per epoxy equivalent. The mixture was heated to 100° C. until homogeneous, whereupon the temperature was raised to 120° C. and a gel was formed in 7 hours. Heating at 120° C. was continued for an additional 14 hours, whereupon the temperature was raised to 160° C. for an additional 6 hours. There was obtained an amber, tough resin.

*Example 6.—Reaction of bis(3,4-epoxy-6-methylcyclohexylmethyl) sebacate, diphenylolpropane and the acid ester adduct of 3 mols of succinic anhydride and 1 mol of glycerol*

A mixture was prepared containing 2.24 grams of bis-(3,4-epoxy-6-methylcyclohexylmethyl) sebacate, 0.79 gram of diphenylolpropane and 0.97 gram of the acid ester adduct of 3 mols of succinic anhydride and 1 mol of glycerol such as to provide 0.8 carboxyl equivalent per epoxy equivalent and 0.7 hydroxyl equivalent per epoxy equivalent. The mixture was heated to a temperature of 100° C. until homogeneous, whereupon the temperature was raised to 120° C. and a gel was formed in 4 minutes at that temperature. Heating at 120° C. was continued for an additional 5 hours, whereupon the temperature was raised to 160° C. for a period of 6 hours. There was obtained a pale yellow, tough resin.

*Examples 7 through 10*

Various mixtures were prepared containing 1.4 grams of 3,4-epoxy-6-methylcyclohexyl 3,4-epoxy-6-methylcyclohexanecarboxylate and various amounts of various polycarboxylic acid compounds and polyols in the corresponding proportions listed in Table II. The resulting mixtures were heated until homogeneous and then maintained at 120° C. for 2.5 hours plus 6 hours at 160° C.

TABLE II

| No. | Polyol | Grams per 1.4 grams of Epoxide | Acid | Grams per 1.4 grams of Epoxide | Ratio [1] |
|---|---|---|---|---|---|
| 7 | Pyrogallol | 0.04 | Adipic | 1.02 | 1/0.1/1.4 |
| 8 | Diphenylolpropane | 0.79 | S.A.G.[2] | 0.97 | 1/0.7/0.8 |
| 9 | Pentaerythritol | 0.24 | S.A.H.[3] | 1.11 | 1/0.7/0.8 |
| 10 | Trimethylolethane | 0.04 | Ethylbutenylsuccinic | 1.3 | 1/0.1/1.4 |

[1] Ratio of epoxy, hydroxyl, carboxyl equivalents, respectively.
[2] Adduct of 3 mols of succinic anhydride with 1 mol of glycerol.
[3] Adduct of 3 mols of succinic anhydride with 1 mol of 1,2,6-hexanetriol.

Table III reflects the properties of the resins prepared from the various examples.

TABLE III

| No.: | Resin description |
|---|---|
| 7 | Tough, Barcol, 0. |
| 8 | Brittle, hard. |
| 9 | Tough, Barcol, 28. |
| 10 | Brittle, hard. |

What is claimed is:

1. Curable compositions comprising (a) epoxides characterized by the general formula:

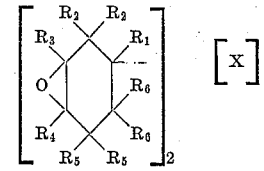

wherein X represent divalent radicals selected from the group consisting of

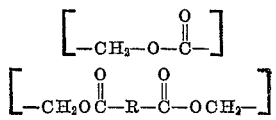

and

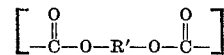

in which R represents members selected from the group consisting of aliphatic and aromatic hydrocarbon groups containing from two through twelve carbon atoms, R' represents members selected from the group consisting of lower aliphatic hydrocarbon groups and lower oxyalkylene groups and $R_1$ through $R_6$ represent members selected from the group consisting of hydrogen and lower alkyl groups; (b) a polycarboxylic acid having y carboxyl groups per epoxy group of said epoxide; and (c) a polyol selected from the group consisting of polyhydric alcohols and polyhydric phenols having z hydroxyl groups per epoxy group of said epoxide, wherein y is a number in the range of from 0.1 to 1.5; $z$ is a number in the range of from 0.01 to 1.0; the sum of $y$ and $z$ is not greater than 1.5 and $y/z$ is at least 1.0.

2. Curable compositions comprising (a) epoxides characterized by the general formula:

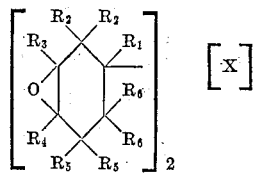

wherein X represents divalent radicals selected from the group consisting of

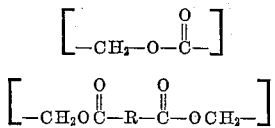

and

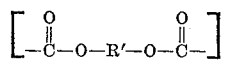

in which R represents members selected from the group consisting of aliphatic and aromatic hydrocarbon groups containing from two through twelve carbon atoms, R′ represents members selected from the group consisting of lower aliphatic hydrocarbon groups and lower oxyalkylene groups and $R_1$ through $R_6$ represent members selected from the group consisting of hydrogen and lower alkyl groups; (b) a polycarboxylic acid having $y$ carboxyl groups per epoxy group of said epoxide; and (c) a polyol selected from the group consisting of polyhydric alcohols and polyhydric phenols having $z$ hydroxyl groups per epoxy group of said epoxide, wherein $y$ is a number in the range of from 0.4 to 1.0; $z$ is a number in the range of from 0.01 to 1.0; the sum of $y$ and $z$ is not greater than 1.0 and $y/z$ is at least 1.0.

3. Curable compositions comprising (a) 3,4-epoxy-6-methylcyclohexylmethyl 3,4-epoxy-6-methylcyclohexanecarboxylate; (b) adipic acid having $y$ carboxyl groups per epoxy group of said diepoxide; and (c) diphenylolpropane having $z$ hydroxyl groups per epoxy group of said diepoxide, wherein $y$ is a number in the range of from 0.1 to 1.5; $z$ is a number in the range of from 0.01 to 1.0; the sum of $y$ and $z$ is not greater than 1.5 and $y/z$ is at least 1.0.

4. Curable compositions comprising (a) 3,4-epoxy-6-methylcyclohexylmethyl 3,4-epoxy-6-methylcyclohexanecarboxylate; (b) glutaric acid having $y$ carboxyl groups per epoxy group of said diepoxide; and (c) pyrogallol having $z$ hydroxyl groups per epoxy group of said diepoxide, wherein $y$ is a number in the range of from 0.1 to 1.5; $z$ is a number in the range of from 0.01 to 1.0; the sum of $y$ and $z$ is not greater than 1.5 and $y/z$ is at least 1.0.

5. Curable compositions comprising (a) 3,4-epoxy-6-methylcyclohexylmethyl 3,4-epoxy-6-methylcyclohexanecarboxylate; (b) maleic acid having $y$ carboxyl groups per epoxy group of said diepoxide; and (c) resorcinol having $z$ hydroxyl groups per epoxy group of said diepoxide, wherein $y$ is a number in the range of from 0.1 to 1.5; $z$ is a number in the range of from 0.01 to 1.0; the sum of $y$ and $z$ is not greater than 1.5 and $y/z$ is at least 1.0.

6. Curable compositions comprising (a) 1,6-hexanediol bis(3,4-epoxycyclohexanecarboxylate); (b) succinic acid-glycerol acid-ester having $y$ carboxyl groups per epoxy group of said diepoxide; and (c) diphenylolpropane having $z$ hydroxyl groups per epoxy group of said diepoxide, wherein $y$ is a number in the range of from 0.1 to 1.5; $z$ is a number in the range of from 0.01 to 1.0; the sum of $y$ and $z$ is not greater than 1.5 and $y/z$ is at least 1.0.

7. Curable compositions comprising (a) bis(3,4-epoxy-6-methylcyclohexylmethyl) sebacate; (b) adipic acid having $y$ carboxyl groups per epoxy group of said diepoxide; and (c) pyrogallol having $z$ hydroxyl groups per epoxy group of said diepoxide, wherein $y$ is a number in the range of from 0.1 to 1.5; $z$ is a number in the range of from 0.01 to 1.0; the sum of $y$ and $z$ is not greater than 1.5 and $y/z$ is at least 1.0.

References Cited in the file of this patent

UNITED STATES PATENTS

| | | |
|---|---|---|
| 2,602,785 | Wiles et al. | July 8, 1952 |
| 2,609,357 | Koroly | Sept. 2, 1952 |
| 2,716,123 | Frostick et al. | Aug. 23, 1955 |
| 2,720,500 | Cody | Oct. 11, 1955 |
| 2,750,395 | Phillips et al. | June 12, 1956 |

FOREIGN PATENTS

| | | |
|---|---|---|
| 530,335 | Canada | Sept. 11, 1956 |

UNITED STATES PATENT OFFICE
CERTIFICATE OF CORRECTION

Patent No. 2,890,197 June 9, 1959

Benjamin Phillips et al.

It is hereby certified that error appears in the printed specification of the above numbered patent requiring correction and that the said Letters Patent should read as corrected below.

Column 5, line 2, for "equivalent" read -- equivalents --; line 14, for "aid" read -- acid --; line 16, for "fumari" read -- fumaric --; column 8, line 74, beginning with "C. for" strike out all to and including "to 120°" in line 75 and insert instead -- geneous, thereupon the temperature was raised to 120° C. for a period of about 3 hours. The time required to --.

Signed and sealed this 19th day of July 1960.

(SEAL)
Attest:

KARL H. AXLINE
Attesting Officer

ROBERT C. WATSON
Commissioner of Patents